May 26, 1970    R. S. HENLY ET AL    3,513,562

FLUIDIZED DRYING DEVICE

Filed March 18, 1968

INVENTOR: Robert S. Henly
Richard F. Kruppa

ATTORNEY Thomas E. Sterbug

3,513,562
FLUIDIZED DRYING DEVICE
Robert S. Henly, Port Matilda, and Richard F. Kruppa, Pine Grove Mills, Pa., assignors to Applied Science Laboratories, Inc., State College, Pa., a corporation of Pennsylvania
Filed Mar. 18, 1968, Ser. No. 713,824
Int. Cl. F26b 9/00
U.S. Cl. 34—57                          6 Claims

ABSTRACT OF THE DISCLOSURE

This invention comprises of a device for mixing, homogenously drying and preconditioning column packings utilized in gas-liquid chromatography. The device is comprised of a preheating chamber into which a gas is introduced, the gas then passes through a fritted disc into a mixing chamber to which stationary phases and solid supports are introduced. By controlling the flow of this gas through the mixing chamber, a fluidizing effect is produced which mixes, evenly drys, and preconditions the contents of the mixing chamber.

---

In the art of gas-liquid chromatography, it is necessary to prepare coated packings (utilized in columns) which are comprised of a solid support upon the surface of which is coated a stationary phase designed to separate complex mixtures. The coating of this solid support within a uniform layer of stationary phase is very important in the gas chromatographic art in that the phase must be evenly or homogenously distributed upon the solid support. Failure to have an even or homogenous distribution on the solid support can later lead to "bleeding" of the stationary phase from the column, poor separating characteristics of the column and/or inability to reproduce chromatographic results. Another disadvantage of a nonuniformly coated support is that the compounds passing through the chromatographic column may react directly with the support. Thus it is important that the stationary phase be uniformly coated on the solid support.

In the gas chromatographic art, solid support comprise any number of inert materials such as "Teflon," diatomaceous earth, glass beads, crushed fire brick, polymer beads, etc. The stationary phase chemicals may include polyesters, polyethylene glycols, methyl silicones, substituted silicones, and numerous other organic chemicals. In the past, the technique utilized for dry packing was generally the "tray drying technique." This involved dissolving the stationary phase in an organic solvent, adding the solid support, and then evaporating the organic solvent from the mixture in a tray. "Rotary evaporation drying techniques" have also been utilized. These generally consist of adding a mixture of stationary phase, solid support and solvent to containers which are then subjected to high vacuum and rotated with or without warming. Both of these methods have the disadvantages in that they are slow, may cause particle breakage, and apparatus used occupies a good deal of laboratory space. This invention seeks to overcome these disadvantages and provide greater uniformity of phase distribution on the solid support.

After the column packing has been properly prepared for use in a chromatograph, it generally is placed in a chromatographic column, attached to the chromatograph and preconditioned. This is done by allowing gas to pass through the column in the chromatograph for a period of at least eight hours, at a temperature above the intended operating temperatures. Failure to properly precondition a column causes poor results when used for analysis. This invention may be also utilized to precondition the column packing prior to its use in the chromatograph, so that no other preconditioning is then necessary. Furthermore, the preconditioning utilizing this device takes but a fraction of the time than is normally necessary to precondition a column in the gas chromatograph.

It is therefore an object of this invention to provide a device and method for homogenously coating a solid support with stationary phase chemicals to be used in the chromatographic arts.

It is also an object of this invention to provide a device and process by which chromatographic column packings may be preconditioned prior to their use in a chromatograph.

It is yet another object of this invention to provide a device whereby an inert solid support may be homogenously and uniformly coated utilizing the fluidization technique.

It is yet another object of this invention to provide a small sturdy, unbreakable and compact fluidizer apparatus for use in laboratory work.

Other objects and a fuller explanation of the invention may be had by referring to the following description and claims, taken in conjunction with the accompanying drawing in which:

Figures 1, 2:
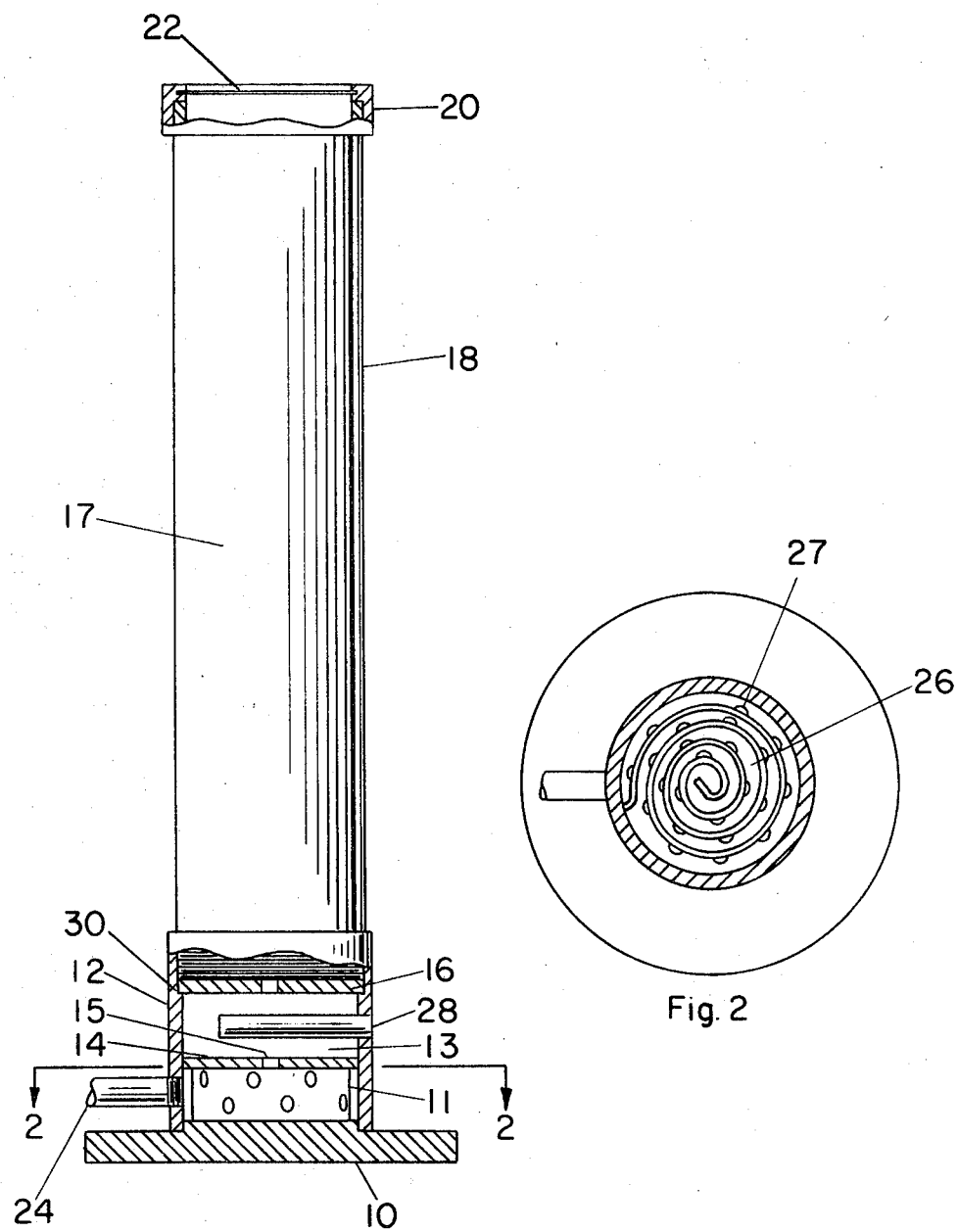
FIG. 1 shows a longitudinal view of the invention, partially in cross section.
FIG. 2 is a fragmentary cross sectional view taken along the lines 2—2 of FIG. 1.

With reference to the drawings, and in particular to FIG. 1, 10 represents a circular base element having a support cylinder 12 longitudinally positioned thereon and integrally attached thereto. The interior of support cylinder 12 is divided into three compartments by a circular cover plate 14 with an opening 15 located in the center, horizontally positioned and integrally attached to the interior of support cylinder 12, and a circular porous plate 16 positioned horiozntally in the interior of support cylinder 12; above circular cover plate 14 thus dividing the interior of support cylinder 12 into three chambers. These chambers may be designated from the bottom upward as heating chamber 11 thermowell chamber 13 and operation chamber 17. A hollow cylindrical barrel 18 is longitudinally positioned and screwably connected to the internal upper portion of the support cylinder 12. The upper portion barrel 18 is covered by a screen cap 20 which fits loosely on the top of barrel 18 and a fine screen 22 integrally attached to screen cap 20 and extending across the upper opening of barrel 18.

Gas inlet tube 24 extends through the lateral portion of support cylinder 12 into the heating chamber. A spiral insert 26 having a protrusion 27 therein is positioned in the heating chamber and silver soldered to the base element 10, cover plate 14 and support cylinder 12 so that its end portion will be adjacent to gas inlet tube 24. Thus gas entering through gas inlet tube 24 will travel through the spiral passage formed by spiral insert 26 to the central portion thereof which is located directly under cover plate opening 15. A cylindrical thermowell 28 is horizontally positioned in the thermowell chamber and extends through the lateral portion of support cylinder 12 to the outside thereof. This thermowell 28 is a sealed receptacle for a temperature measuring device which may be inserted therein from the outside. The entire device is made of metal, preferably chromium plated brass, with the exception of the porous plate which is generally made of fused and porous bronze.

Porous plate 16 may be inserted in the upper portion of support cylinder 12 when barrel 18 is removed. Porous plate 16 will then rest upon flange 30 in the inside bore of support cylinder 12 and is secured in position by barrel 18 which is screwably forced into contact with porous plate 16. The outer lateral surfaces of spiral insert 26 has a series of protrusions 27 thereon which prevent spiral insert 26 from touching itself along the spiral section.

In operation, a source of gas under pressure is connected to the gas inlet tube 24. A number of gases may be used as fluidizing gas such as nitrogen, other inert gases or air. Nitrogen is recommended for the fluidizing gas during preconditioning because it is inert and inexpensive, although compressed air can be used to dry the packings. A molecular sieve or drierite trap can be inserted in the gas line between the gas supply cylinder and the invention if desired. A cylinder reducer valve in the 0–5 pounds per square inch range is recommended although 0–30 pound per square inch may be used if great care is taken when turning on the fluidizing gas.

A thermometer or other temperature measuring device is then placed in the thermowell 28 to measure the temperature of the gas within the thermowell chamber. The invention is then placed upon a hot plate or other heating device with the base section 12 in contact with the plate. The heat supply should be controlled by operating a hot plate, if electrical, through a laboratory Variac which in turn will control the temperature of the gas below the porous plate 16 within a 5° C. range.

A filtered mixture of solid support solvent and stationary phase prepared in the manner described below is then poured into barrel 18 or operation chamber 17 and a flow of gas begun through gas inlet tube 24. The gas enters the device through gas inlet tube 24 and proceeds around the spiral passageway formed by spiral insert 26 to the central portion of the heating chamber. Since base section 12 is being heated, as previously described, the gas will, during its travel, become hot. The hot gas will then pass through cover plate opening 15 and into the thermowell chamber 13, thence through the porous plate 16 into barrel 18 or operation chamber 17 and ultimately out through screen 22. The temperature is measured by a thermometer, or other temperature measuring device inserted in the thermowell 28.

When the gas flows through the porous plate 16 into the interior of barrel 18 it passes through the "charge" therein and is so regulated that it "fluidizes" this charge. With this technique, an intimate mixing of the stationary phase and solid support is obtained during drying which results in a homogenous coating of the stationary phase upon the solid support. At the same time, the gas passing through the barrel 18 evaporates the solvent thus drying the coated support. The ultimate result is a uniformly and homogenously coated solid support by the stationary phase.

The "charge" placed in the interior of barrel 18 may be prepared by two procedures:

(1) The filtration-fluidization procedure or the
(2) Slurry fluidization procedure as described below

FILTRATION-FLUIDIZATION PROCEDURE

The following symbols will be used in this description:

$x$ equals weight of support to be coated
$y$ equals w./v. stationary phase divided by 100

Step 1.—Weight $x$ grams of support into a beaker or similar container. Weight $5xy$ grams of stationary phase in another beaker. Measure $5x$ ml. of solvent in a graduated cylinder and add to the stationary phase. Completely dissolve the liquid phase in the solvent by stirrer. Minimize evaporation of the solvent so as not to change stationary phase concentration significantly.

Step 2.—Place the Hi-Eff fluidizer on the hot plate, turn on the Variac and let the unit warm up without gas flow, while performing Step 3. Step 3 and warm-up of the fluidizer both require about 10 minutes.

Step 3.—Slowly add the support to the solution with constant but gentle stirring with a glass rod or other convenient device. Let the support settle for 5 minutes, then slurry again by gentle stirring. Immediately pour the cream-like mixture into a Buchner funnel mounted on a vacuum filter flask. Apply vacuum to the flask with an aspirator and filter off the excess solution. Continue filtration until dripping of the solution from the funnel ceases.

Step 4.—Transfer the damp packing to the fluidizer through a wide mouth funnel by inverting the Buchner funnel over the fluidizer and tapping gently with the heel of the hand. Slowly turn on fluidizing gas and closely observe the packing. It will rise upward as a solid plug and the proper gas setting can be made by allowing ¼ to ½ inch rise of the plug in the barrel.

Step 5.—Put the cap in place and leave the unit alone for two minutes. After two minutes the packing should begin to fluidize. If the fluidization is too violent, decrease the gas flow rate. The packing is dry when no odor of solvent can be detected in the effluent gas stream at the top of the fluidizer. The total drying time is 5 to 15 minutes depending on the amount of packing and volatility of the solvent used in making the packing.

Step 6.—Pour the finished packing from the fluidizer by grasping the barrel by its top.

SLURRY FLUIDIZATION PROCEDURE

The method suggested here is adapted from Kaiser (2) and appears to work quite well with this unit. This method may be used for heavy coats (about 10) at the discretion of the user. For phase loadings above 20 this will prove the most economical and may give as good a packing as the filtration procedure does for that high a loading. Gas (compressed air, nitrogen) is blown through the unit at a rate of about 6 cu. ft./hr. While gas is flowing, 25 to 50 g. of the dry support is tipped into the unit. The calculated quantity of stationary phase, diluted with appropriate solvent is then added and gently stirred. The quantity of solvent used is calculated in such a way that at the start of the impregnation process the stationary phase solution completely covers the support. The temperature is controlled in such a way that the whole process is complete with 30 minutes for 25 g. of packing with chloroform and a gas inlet temperature of 60° C. (The gas must, of course, be pure and above all dry. This method gives a substantial yield of good quality column packing and is readily reproducible. As the material is subjected to hardly any mechanical stress, supports liable to abrasion may be treated.)

When the gas rate is started, pressure should be raised slowly and carefully. If too much pressure is suddenly applied, the slug of wet packing will blow out of the top of the fluidizer. If the gas rate is too high after fluidization of the packing starts, the packing will impinge on and cling to the underside of the screen cap. This is readily observed if it occurs. In this case, decrease the gas rate and remove the cap temporarily to observe the packing. When fluidization is correct, the packing will look like a gently boiling liquid. The gas rate can be adjusted accordingly but pressures in the range of 1 to 5 pounds per square inch will give the desired results. However, the top of the barrel should remain cool enough to hold unless the temperature limit is exceeded.

In addition to the coating and drying operation as described above, the device may be used to precondition column packings as well. The preconditioning operation is similar to the mixing and drying operation except that it is done at a temperature range of 100–300° C. for 1 to 3 hours whereas the coating and drying operation is carried out at a maximum of 120° C. upward to 30 minutes, depending upon the type of charge used.

The device may be simply cleaned after either of these operations by blowing out the unit with compressed gas, or by disassembling the device removing the porous plate 16 and cleaning the barrel 18 and plate with a suitable solvent. The base element 10 needs no cleaning unless a solution of phase has been inadvertently poured into the unit without gas flow.

The use of fluidized drying for preparation of column packing in this device has proven to be superior to the conventional tray-drying procedure for solid polyester and silicon phases. Columns of greater efficiency can be produced from fluidized dry packing and greater reproducibility from batch to batch is possible. The degree of improvement is greatest with low loaded packing and it is here that the fluidized drying demonstrates its greatest advantage. The technique is rapid and the gentle treatment of the fragile diatomaceous earth's particles avoid breakage. The below listed examples indicate by experimental evidence the advantage of the fluidized drying technique in the laboratory utilizing the device of this invention.

Example I

A series of packings were prepared in 50 gram batches by the filtration technique. Approximately 250 ml. of solvent was used to dissolve the phase in a beaker, the support was added with gentle stirring and the resulting slurry was carefully poured into a Buchner funnel fitted with a filter flask. Excess solution was removed by vacuum filtration and the damp packing was split into two parts. The first part was tray dried in a thin layer by means of infrared bulbs; this took 30 to 40 minutes. The second part was gently dried in the fluidizer unit with about 1 p.s.i.g. of nitrogen. When preheated gas was to be used the fluidizer was placed on a hot plate controled by a Variac and allowed to warm up for 15 minutes. A settling of 40 volts achieved a fluidizing gas temperature of 80° C. Drying time was four to five minutes when preheated gas was used.

The packings were evaluated in a Barber-Column Model 5000 chromatograph equipped with a flame ionization detector, using nitrogen as carrier gas. All columns were six-foot glass U-tubes filled by adding the packing in 0.5 gram increments and vibrating the bottom until all settling ceased (five to ten seconds per increment).

TABLE I

[3% QF-1 on 100/120 gas-chrom Q; six-foot columns]

| Support Lot | Theoretical Plates (cholesterol) | Drying Conditions |
| --- | --- | --- |
| A | 4,300 | PF-H |
| A | 4,700 | PF-H |
| A | 3,900 | SF-PF-H |
| B | 3,900 | SF-PF-H |
| A | 3,600 | SF-PF |
| B | 3,700 | SF-PF |
| A | 3,700 | PF |
| B | 3,700 | PF |
| A | 2,500 | Tray-dried |
| B | 2,700 | Do. |
| B | 2,400 | SF-Tray-dried |

PF—packing fluidized; SF—support fluidized; H—heat used during fluidization.

Column operating parameters: column 230° C., flash heater 275–300° C., detector 250° C. Flow rates 30 to 40 ml./min. with nitrogen pressures from 12 to 16 p.s.i.g.

The initial studies with QF–1 packings (shown in Table I) indicated that maximum efficiency columns were produced when some form of heat was used during this fluidizing. Attempts to fluidize the support to remove fines before coating did not result in any improvement of the final packing. The packings dried by fluidization with preheated gas produced columns which averaged 1700 theoretical plates better than columns made from tray-dried packings, as shown in Table I. When heat was not used in the fluidization process a decrease in average theoretical plates of 500 was noted.

Example II

This example tests a low-loaded polyester which may be seen in the below Table II. The separation of trimethylsilyl derivatives of a mixture of a pregnanediol (PD), androsterone (A), dehydroepiandrosterone (DHEA), etiocholanolone (E), and pregnanetriol (PT) was selected for this packing evaluation. This mixture was a fortunate choice since the relative retention, E/PT, decreases from approximately 1.10 to 0.9 as phase loading is lowered below 3%. The relative retention times for the critical pair E/PT showed less than 1% variation from batch to batch of fluidized packing, while the tray-dried packings exhibited almost 5% variation. Closely reproducible results with all five components were achieved on the fluidized packings, as is shown in the bottom part of Table II. Except for the pressures, which had to be varied between 14 and 16 p.s.i.g., the operating conditions of all columns prepared from fluidized packings were identical. The fluidized packings averaged 1200 more theoretical plates than the tray-dried packings and showed much less variation in efficiencies.

TABLE II

[3% EGSS-X on 100/120 gas-chrom Q; six foot columns]

| Test packing, lot | Theoretical Plates, DHEA | | Relative Retention, E/PT | |
| --- | --- | --- | --- | --- |
| | P F-H | Tray-dried | PF-H | Tray-dried |
| K | 4,000 | 3,200 | 1.08 | 1.09 |
| L | 3,600 | 2,200 | 1.09 | 1.10 |
| M | 3,600 | 2,800 | 1.09 | 1.07 |
| N | 3,800 | 1,800 | 1.08 | 1.05 |

Fluidized Packing Retention Data

| Test packing, lot | Absolute Retention Time, PD (min.) | Relative Retention | | | | |
| --- | --- | --- | --- | --- | --- | --- |
| | | PD | A | PT | E | DHEA |
| K | 3.80 | 1.00 | 2.14 | 2.84 | 3.08 | 3.86 |
| L | 3.78 | 1.00 | 2.15 | 2.84 | 3.09 | 3.87 |
| M | 3.75 | 1.00 | 2.16 | 2.86 | 3.11 | 3.89 |
| N | 3.85 | 1.00 | 2.14 | 2.85 | 3.07 | 3.84 |

Column operating parameters: column 200° C., flash heater 245–255° C., and detector 250° C. Flow rates 40 to 45 ml./min. at pressures between 13 and 16 p.s.i.g. nitrogen.

Although we have described the invention with a certain degree of particularity, it is understood that the present disclosure has been made only by way of example and that numerous changes in the details of the construction and the combination and arrangement of parts as well as the process steps may be resorted to without departing from the spirit and scope of the invention as hereafter claimed.

What is claimed is:

1. A fluidizing device for use in the preparation of column packings utilized in gas chromatography comprising in combination:
   a base element;
   a hollow support cylinder, one end of which is integrally attached to said base element;
   a hollow cylindrical barrel removably attached to the end portion of said support cylinder opposite to that attached to said base;
   a gas inlet tube in communication with the interior of said support cylinder;
   a cover plate having an opening therein positioned with said support cylinder so as to form a heat chamber in the lower portion thereof, said gas inlet tube being in communication with said heat chamber;
   a porous plate removably attached to the interior of said support cylinder so as to form a thermowell chamber in communication with said heat chamber;
   a screen cap removably positioned on the end portion of said cylindrical barrel opposite that of said support cylinder;
   whereby the communicating passage is formed from said gas inlet tube, heat chamber, thermowell chamber, porous plate, interior of said cylindrical barrel, through said screen cap.

2. The combination as claimed in claim 1 in which said heat chamber contains passage means for circulating inert gas therein to heat said inert gas.

3. The combination as claimed in claim 2 in which said means is comprised of a spiral insert, said insert forming a communicating passage from said gas inlet tube to said opening in said cover plate.

4. The combination as claimed in claim 3 in which said porous plate is composed of a metallic or glass material.

5. The combination as claimed in claim 4 in which said cylindrical barrel is screwably attached to said support cylinder.

6. The combination as claimed in claim 5 in which said porous plate is secured in position by said cylindrical barrel.

References Cited

UNITED STATES PATENTS

| | | | |
|---|---|---|---|
| 748,894 | 1/1904 | Trump | 34—10 |
| 2,357,901 | 9/1944 | Lewis et al. | |
| 2,715,282 | 8/1955 | Niven. | |
| 3,040,439 | 6/1962 | Frost. | |
| 3,349,499 | 10/1967 | Katano | 34—10 |

DONLEY J. STOCKING, Primary Examiner

R. A. DUA, Assistant Examiner